(12) United States Patent
Schlosser et al.

(10) Patent No.: US 12,043,719 B2
(45) Date of Patent: Jul. 23, 2024

(54) FLAME RETARDANT MIXTURE

(71) Applicants: CLARIANT INTERNATIONAL LTD, Muttenz (CH); WILLIAM BLYTHE LTD, Harlow (GB)

(72) Inventors: Elke Schlosser, Augsburg (DE); Sebastian Hörold, Diedorf (DE); David Crossley, Harlow (GB); John Williams, Harlow (GB); Andrew Bamford, Harlow (GB)

(73) Assignee: Clariant International Ltd, Muttenz (CH)

( * ) Notice: Subject to any disclaimer, the term of this patent is extended or adjusted under 35 U.S.C. 154(b) by 503 days.

(21) Appl. No.: 17/422,902

(22) PCT Filed: Jan. 16, 2019

(86) PCT No.: PCT/EP2019/051019
§ 371 (c)(1),
(2) Date: Jul. 14, 2021

(87) PCT Pub. No.: WO2020/147943
PCT Pub. Date: Jul. 23, 2020

(65) Prior Publication Data
US 2022/0119625 A1    Apr. 21, 2022

(51) Int. Cl.
*C08K 13/04*      (2006.01)
*C08K 3/016*      (2018.01)
(Continued)

(52) U.S. Cl.
CPC .............. *C08K 13/04* (2013.01); *C08K 3/016* (2018.01); *C09D 5/185* (2013.01); *C09D 7/61* (2018.01);
(Continued)

(58) Field of Classification Search
CPC .... C08K 3/016; C08K 5/0066; C08K 5/5313; C08K 3/16; C09K 21/04; C09K 21/12
See application file for complete search history.

(56) References Cited

U.S. PATENT DOCUMENTS 3,900,444 A   8/1975  Racky et al.
4,036,811 A   7/1977  Noetzel et al.
(Continued)

FOREIGN PATENT DOCUMENTS

CN   1599776      3/2005
CN   104611702 A  5/2015
(Continued)

OTHER PUBLICATIONS

Partial machine translation of CN 105131578 (Year: 2015).*
(Continued)

*Primary Examiner* — Kregg T Brooks

(57) ABSTRACT

The invention relates to a mixture containing as component A at least one organic phosphinic acid salt and as component B at least one alkali metal stannate ($M'_2SnO_3$), alkali metal hydroxyl stannate ($M'_2Sn(OH)_6$), alkaline earth metal stannate ($M''SnO_3$) and/or alkaline earth metal hydroxy stannate ($M''Sn(OH)_6$). The invention relates also to the use of such a mixture.

25 Claims, 1 Drawing Sheet

Die for the thermoplastic wear investigations by the DKI platelet method

(51) Int. Cl.
| | |
|---|---|
| *C08K 3/22* | (2006.01) |
| *C08K 3/32* | (2006.01) |
| *C08K 3/38* | (2006.01) |
| *C08K 5/529* | (2006.01) |
| *C08K 5/5313* | (2006.01) |
| *C08K 7/14* | (2006.01) |
| *C09D 5/18* | (2006.01) |
| *C09D 7/61* | (2018.01) |
| *C09D 7/63* | (2018.01) |
| *C09K 21/04* | (2006.01) |
| *C09K 21/12* | (2006.01) |

(52) U.S. Cl.
CPC ............... *C09D 7/63* (2018.01); *C09K 21/04* (2013.01); *C09K 21/12* (2013.01); *C08K 2003/2231* (2013.01); *C08K 2003/327* (2013.01); *C08K 2003/387* (2013.01); *C08K 5/529* (2013.01); *C08K 5/5313* (2013.01); *C08K 7/14* (2013.01)

(56) References Cited

U.S. PATENT DOCUMENTS

| | | |
|---|---|---|
| 6,207,736 B1 | 3/2001 | Nass et al. |
| 6,255,371 B1 | 7/2001 | Schlosser et al. |
| 6,365,071 B1 | 4/2002 | Jenewein et al. |
| 6,509,401 B1 | 1/2003 | Jenewein et al. |
| 2004/0254270 A1* | 12/2004 | Harashina ............ C08K 5/16 524/115 |
| 2006/0074157 A1* | 4/2006 | Bauer ............... C08K 5/5313 524/115 |
| 2010/0001430 A1 | 1/2010 | Yin |
| 2011/0021676 A1 | 1/2011 | Hoerold et al. |
| 2013/0190432 A1 | 7/2013 | Krause et al. |
| 2018/0119017 A1 | 5/2018 | Schlosser et al. |
| 2019/0153197 A1 | 5/2019 | Krause et al. |

FOREIGN PATENT DOCUMENTS

| | | | |
|---|---|---|---|
| CN | 105131578 | A | 12/2015 |
| CN | 105439555 | A * | 3/2016 |
| DE | 2252258 | A1 | 5/1974 |
| DE | 2447727 | A1 | 4/1976 |
| DE | 19614424 | A1 | 10/1997 |
| DE | 19734437 | A1 | 2/1999 |
| DE | 19737727 | A1 | 7/1999 |
| DE | 19933901 | A1 | 2/2001 |
| DE | 102010048025 | A1 | 4/2012 |
| DE | 102015004662 | A1 | 10/2016 |
| EP | 0699708 | B1 | 3/1996 |
| JP | H10297920 | | 11/1998 |
| JP | 2003226818 | | 8/2003 |
| JP | 2005179360 | A | 7/2005 |
| JP | 2013503938 | | 2/2013 |
| JP | 2016535126 | A | 11/2016 |
| KR | 20160083011 | A | 7/2016 |
| KR | 20170137847 | A | 12/2017 |
| KR | 20180114945 | A | 10/2018 |
| TW | 201229219 | A | 7/2012 |
| WO | 97/39053 | A1 | 10/1997 |
| WO | 2009/109318 | A1 | 9/2009 |
| WO | 2011028675 | A1 | 3/2011 |
| WO | 2018029449 | | 2/2018 |
| WO | 2018050498 | A1 | 3/2018 |
| WO | 2020147943 | A1 | 7/2020 |

OTHER PUBLICATIONS

Partial machine translation of CN-105439555-A (Year: 2016).*
Office Action issued in corresponding Taiwan Patent Application No. 108101630, dated Jul. 1, 2022.
Zhang et al: "A polyurethane/PVC cross-linked cable material capable of being used for automobile cable and its manufacture method", CA, Chemical Abstracts Service, Columbus, Ohio, US, Apr. 17, 2018 (Apr. 17, 2018), XP002780117.
International Search Report (with partial translation) and Written Opinion dated Oct. 4, 2019, issued in corresponding International Patent Application No. PCT/EP2019/051019.

* cited by examiner

Die for the thermoplastic wear investigations by the DKI platelet method
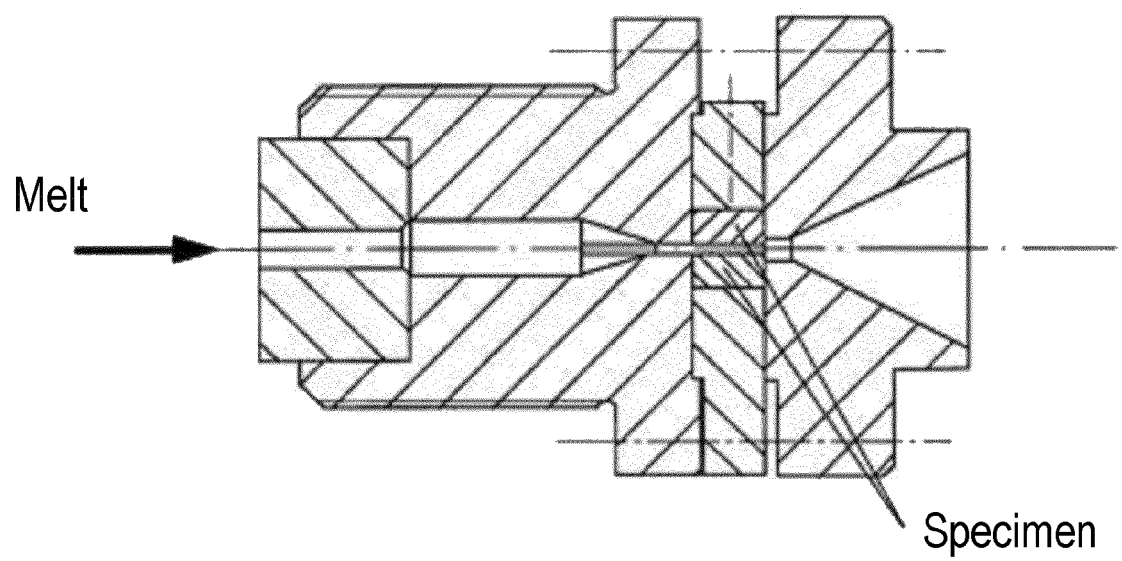

FLAME RETARDANT MIXTURE

The invention relates to a noncorrosive flame-retardant mixture and its use.

For thermoplastic polymers in particular, the salts of phosphinic acids (phosphinates) have proven effective flame-retardant additives (DE-A-2252258 and DE-A-2447727). Calcium and aluminum phosphinates have been described as particularly effective in their activity in polyesters, and have less of an adverse effect on the engineering properties of the polymer molding compositions than, for example, the alkali metal salts (EP-A-0699708). Furthermore, synergistic combinations of phosphinates with certain nitrogen-containing compounds have been found which act more effectively as flame retardants across a whole range of polymers than do the phosphinates on their own (PCT/EP97/01664 and also DE-A-19734437 and DE-A-19737727).

DE-A-19614424 describes phosphinates in conjunction with nitrogen synergists in polyesters and polyamides. DE-A-19933901 describes phosphinates in combination with melamine polyphosphate as flame retardants for polyesters and polyamides. When these very effective flame retardants are used, however, there may be partial polymer degradation and also instances of polymer discoloration, especially at processing temperatures above 300° C., and there may be instances of efflorescence on storage under hot-humid conditions.

Thermoplastics are processed predominantly in the melt. Hardly any plastic withstands the associated changes in structure and physical state under thermal and shearing exposure without undergoing alteration in its chemical structure. Crosslinking, oxidation, changes in molecular weight, and hence also changes in the physical and technical properties may be the consequence. In order to lessen the burden on the polymers during processing, additives are added which vary according to the plastic in question.

Through the use of flame retardants there may be additional destabilization during processing in the melt. Flame retardants must often be added at high rates in order to ensure sufficient flame retardancy of the plastic in accordance with international standards. The chemical reactivity of flame retardants, which they need for the flame retardancy effect at high temperatures, may result in them adversely affecting the processing stability of plastics. For example, there may be increased polymer degradation, crosslinking reactions, outgassing or discoloration.

The incorporation of flame retardants, particularly of phosphinates, may cause increased wear to processing machines, such as extruders and injection molding machines, for example. Parts particularly affected may be metal parts of the plastifying unit and of the die during compounding and/or injection molding. The higher the processing temperature of the polymers, the greater the rate at which wear may occur.

Generally speaking, hard fillers (such as glass fibers) together with corrosive elimination products (from flame retardants, for instance) lead to wear to metallic surfaces of tooling. Depending on the quality of material of the metallic surfaces and on the plastics used, this wear necessitates relatively frequent replacement of heating jackets in the conveying unit, of the conveying screw, and of the injection molds. Since glass fiber-reinforced thermoplastic polymers are abrasive, there are limits to the possibilities of protecting the conveying screws from corrosion, since highly corrosion-resistant steels do not have the hardness needed for the processing of glass fiber-reinforced polymers.

Corrosion according to DIN EN ISO 8044 is the physicochemical interaction between a metal and its environment, with the possible consequence of alteration to the properties of the metal and thus of considerable impairment of the function of the metal, of the environment, or of the technical system of which the metal forms a part.

WO-A-2009/109318 describes methods for producing flame-retardant, noncorrosive and readily flowable polyamide and polyester molding compositions. A variety of additives can be used to reduce, but not prevent, the corrosion and/or the wear caused by flame retardants.

US-A-2010/0001430 describes a flame-retarded semiaromatic polyamide with zinc stannate, which exhibits a much-reduced corrosiveness. Even here, nevertheless, a certain level of wear is measurable.

DE-A-102010048025 describes flame retardant/stabilizer combinations for thermoplastic polymers that exhibit high flame retardancy with good mechanical properties and at the same time exhibit no discoloration or efflorescence due to polymer degradation and decomposition reactions. It is noted that the flame retardant/stabilizer combination exhibits low corrosion.

In DE-A-02015004662 a method is described for producing flame-retardant and non-corrosive polyamide compounds which contain phosphinates, synergists and an inorganic zinc compound. The disadvantage of this invention arises especially in polyamides which are processed at high temperatures. Stabilizing and anti-corrosive effect is limited and/or discoloration to brownish-black of molding compound occurs.

There is a need in the market for stable and non-corrosive, flame retarded compounds within the range of eco-toxicity regulations. More and more applications afford the use of high temperature polymers which has to be flame retarded and non-corrosive and colorable with all colors.

It was an object of the present invention, accordingly, to provide flame-retarded polymers which are halogen-free, exhibit high stability, good mechanical properties, and no measurable corrosion and no reactions leading to discoloration when they are processed.

This object is achieved through the use of a mixture of a salt of a dialkylphosphinic acid (component A) and a selected metal stannate (component B). The mixture can also contain further components.

Subject matter of the invention is therefore a mixture containing as component A at least one organic phosphinic acid salt and as component B at least one alkali metal stannate (M'$_2$SnO$_3$), alkali metal hydroxyl stannate (M'$_2$Sn(OH)$_6$), alkaline earth metal stannate (M"SnO$_3$) and/or alkaline earth metal hydroxy stannate (M"Sn(OH)$_6$).

In this mixture, preferably M' is one of Na or K and M" is one of Mg, Ca or Ba.

Preferably, the at least one organic phosphinic acid salt corresponds to formula (I)

wherein
R$^1$, R$^2$ are the same or different and are each H, C$_1$-C$_{18}$-alkyl, linear or branched, C$_6$-C$_{18}$-aryl, C$_7$-C$_{18}$-arylalkyl or C$_7$-C$_{18}$-alkylaryl, or R$^1$ and R$^2$ form one or more rings with each other, M is Mg, Ca, Al, Sb, Sn, Ge, Ti, Zn, Fe, Zr, Ce, Bi, Sr, Mn, Li, Na, K and/or a protonated nitrogen base;

m is from 1 to 4.

Preferably are $R^1$, $R^2$ the same or different and are each methyl, ethyl, n-propyl, isopropyl, n-butyl, tert-butyl, n-pentyl, 2-pentyl, 3-pentyl, 2-methylbutyl, 3-methylbutyl(isomentyl), 3-methylbut-2-yl, 2-methylbut-2-yl, 2,2-dimethylpropyl(neopentyl), hexyl, heptyl, octyl, nonyl, decyl, cyclopentyl, cyclopentylethyl, cyclohexyl, cyclohexylethyl, phenyl, phenylethyl, methylphenyl and/or methyl phenylethyl.

Preferable, in formula (I), M is a calcium, aluminum, zinc, titanium or iron ion.

Preferably, component B has a surface area of 20 to 200 m2/g BET.

Preferably, the mixture contains 40 to 99.9% by weight of component A and 0.1 to 60% by weight of component B.

More preferably, the mixture contains 70 to 99.9% by weight of component A and 0.1 to 30% by weight of component B. In particular, the mixture contains 90 to 99.5% by weight of component A and 0.5 to 10% by weight of component B.

Preferably, the mixture as claimed in one or more of claims 1 to 8, contains as further component C 0 to 79.9% by weight of a nitrogen-containing and/or a phosphorus/nitrogen and/or phosphorus containing synergist or flame retardant which comprises a salt of phosphorous acid having the formula (II)

$$[HP(=O)O_2]^{2-}M'''^{m+} \quad (II)$$

in which

M''' is Mg, Ca, Al, Sb, Sn, Ge, Ti, Zn, Fe, Zr, Ce, Bi, Sr, Mn, Li, Na and/or K; as further component D 0 to 3% by weight of a phosphonite or of a mixture of a phosphonite and a phosphite;

as further component E 0 to 3% by weight of an ester or salt of long-chain aliphatic carboxylic acids (fatty acids), which typically have chain lengths of $C_{1-4}$ to $C_{40}$, the sum of the components always being 100% by weight; and as further component F, from 0 to 20% by weight of telomeric phosphinic acid salts.

Preferably, the mixture comprises 40 to 98.9% by weight of component A,
1 to 39.9% by weight of component B,
0.1 to 59% by weight of component C,
0 to 2% by weight of component D,
0 to 2% by weight of component E and
0 to 20% by weight of component F.

More preferably, the mixture comprises 50 to 94.5% by weight of component A,
5 to 39.5% by weight of component B,
0.5 to 45% by weight of component C,
0 to 2% by weight of component D,
0 to 2% by weight of component E and
0 to 20% by weight of component F.

More preferably, the mixture comprises 60 to 94% by weight of component A,
5 to 30% by weight of component B,
1 to 35% by weight of component C,
0 to 2% by weight of component D,
0 to 2% by weight of component E and
0 to 20% by weight of component F.

Most preferably, the mixture comprises 60 to 89.7% by weight of component A,
5 to 20% by weight of component B,
5 to 20% by weight of component C,
0.1 to 2% by weight of component D and
0.1 to 2% by weight of component E and
0.1 to 20% by weight of component F.

Preferably, in the mixture according to the present invention, component C comprises reaction products of phosphorous acid with aluminum compounds.

Preferably, component C comprises aluminum phosphite $[Al(H_2PO_3)_3]$, secondary aluminum phosphite $[Al_2(HPO_3)_3]$, basic aluminum phosphite $[Al(OH)(H_2PO_3)_2*2\ aq]$, aluminum phosphite tetrahydrate $[Al_2(HPO_3)_3*4\ aq]$, aluminum phosphonate, $Al_7(HPO_3)_9(OH)_6(1,6\text{-hexanediamine})_{1.5}*12H_2O$, $Al_2(HPO_3)_3*xAl_2O_3*nH_2O$ with x=1-2.27 and n=1-50 and/or $Al_4H_6P_{16}O_{18}$, or comprises aluminum phosphites of the formulae (III), (IV) and/or (V), where formula (III) comprises:

$$Al_2(HPO_3)_3 \times (H_2O)_q$$

and q is 0 to 4;

formula (IV) comprises $$Al_{2.00}M_z(HPO_3)_y(OH)_v \times (H_2O)_w$$

and

M is alkali metal ions,
z is 0.01 to 1.5,
y is 2.63 to 3.5,
v is 0 to 2, and
w is 0 to 4;

formula (V) comprises $$Al_{2.00}(HPO_3)_u(H_2PO_3)_t \times (H_2O)_s$$

and u is 2 to 2.99 and
t is 2 to 0.01 and
s is 0 to 4, or the aluminum phosphite comprises mixtures of aluminum phosphite of the formula (III) with sparingly soluble aluminum salts and nitrogen-free foreign ions, mixtures of aluminum phosphite of the formula (IV) with aluminum salts, mixtures of aluminum phosphites of the formulae (IV) to (V) with aluminum phosphite $[Al(H_2PO_3)_3]$, with secondary aluminum phosphite $[Al_2(HPO_3)_3]$, with basic aluminum phosphite $[Al(OH)(H_2PO_3)_2*2\ aq]$, with aluminum phosphite tetrahydrate $[Al_2(HPO_3)_3*4\ aq]$, with aluminum phosphonate, with $Al_7(HPO_3)_9(OH)_6(1,6\text{-hexanediamine})_{1.5}*12H_2O$, with $Al_2(HPO_3)_3*xAl_2O_3*nH_2O$ with x=1-2.27 and n=1-50 and/or with $Al_4H_6P_{16}O_{18}$.

Preferably, component C comprises condensation products of melamine and/or reaction products of melamine with polyphosphoric acid and/or reaction products of condensation products of melamine with polyphosphoric acid, or mixtures thereof; or comprises melem, melam, melon, dimelamine pyrophosphate, melamine polyphosphate, melem polyphosphate, melam polyphosphate, melon polyphosphate and/or mixed polysalts thereof; or comprises nitrogen-containing phosphates of the formulae $(NH_4)_y H_{3-y} PO_4$ and/or $(NH_4PO_3)_z$, where y is 1 to 3 and z is 1 to 10000.

Preferably, the phosphonites (component D) are of the general structure $$R-[P(OR_1)_2]_m \quad (VI)$$

where

R is a mono- or polyvalent aliphatic, aromatic or heteroaromatic organic radical and $R_1$ is a compound of the structure (VII)

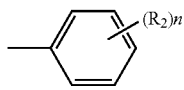
(VII)

or the two radicals $R_1$ form a bridging group of the structure (VIII)

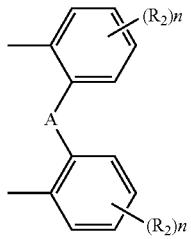
(VIII)

where

A is direct bond, O, S, $C_1$-$C_{18}$-alkylene (linear or branched), $C_1$-$C_{18}$-alkylidene (linear or branched), in which $R_2$ independently at each occurrence is $C_1$-$C_{12}$-alkyl(linear or branched), $C_1$-$C_{12}$-alkoxy and/or $C_5$-$C_{12}$-cycloalkyl, and n is 0 to 5, and m is 1 to 4.

Preferably, component E comprises alkali metal, alkaline earth metal, aluminum and/or zinc salts of long-chain fatty acids having 14 to 40 carbon atoms and/or reaction products of long-chain fatty acids having 14 to 40 carbon atoms with polyhydric alcohols, such as ethylene glycol, glycerol, trimethylolpropane and/or pentaerythritol.

The telomeric phosphinic acid salts (component F) are preferably metal salts of ethyl butyl phosphinic acid, dibutyl phosphinic acid, ethyl hexyl phosphinic acid, butyl hexyl phosphinic acid, ethyl octyl phosphinic acid, sec-butyl ethyl phosphinic acid, 1-ethylbutyl-butyl-phosphinic acid, ethyl-1-methylpentyl-phosphinic acid, di-sec-butyl phosphinic acid (di-1-methyl-propyl phosphinic acid), propyl-hexyl phosphinic acid, dihexyl phosphinic acid, hexyl-nonyl phosphinic acid, propyl-nonyl phosphinic acid, dinonyl phosphinic acid, dipropyl phosphinic acid, butyl-octyl phosphinic acid, hexyl-octyl phosphinic acid, dioctyl phosphinic acid, ethyl cyclopentylethyl phosphinic acid, butyl cyclopentylethyl phosphinic acid, ethyl cyclohexylethyl phosphinic acid, butyl cyclohexylethyl phosphinic acid, ethyl phenylethyl phosphinic acid, butyl phenylethyl phosphinic acid, ethyl 4-methylphenylethyl phosphinic acid, butyl 4-methylphenylethyl phosphinic acid, butyl cyclopentyl phosphinic acid, butyl cyclohexylethyl phosphinic acid, butyl phenyl phosphinic acid, ethyl 4-methylphenyl phosphinic acid and/or butyl 4-methylphenyl phosphinic acid and wherein the metal is minimum one of the group Mg, Ca, Al, Sb, Sn, Ge, Ti, Fe, Zr, Zn, Ce, Bi, Sr, Mn, Li, Na and/or K.

The present invention comprises also the use of a mixture as claimed in one or more of claims 1 to 20 as a binder, as a crosslinker or accelerator in the curing of epoxy resins, polyurethanes or unsaturated polyester resins; as polymer stabilizers, as crop protection compositions, as sequestrants, as a mineral oil additive, as an anticorrosive, in washing and cleaning composition applications and in electronics applications.

The present invention comprises also the use of mixtures as claimed in at least one of claims 1 to 20 as a flame retardant, especially as a flame retardant for clearcoats and intumescent coatings, as a flame retardant for wood and other cellulosic products, as a reactive or nonreactive flame retardant for polymers, for production of flame-retardant polymer molding compositions, for production of flame-retardant polymer moldings and/or for rendering polyester and pure and blended cellulose fabrics flame-retardant by impregnation, and as a synergist.

The present invention comprises also a flame-retardant thermoplastic or thermoset polymer molding composition or polymer molding, film, filament, fiber or polymer shaped body comprising 0.5 to 45% by weight of mixtures as claimed in at least one of claims 1 to 20, 55 to 99.5% by weight of thermoplastic or thermoset polymer or mixtures thereof, 0 to 55% by weight of additives and 0 to 55% by weight of filler or reinforcing materials, where the sum of the components is 100% by weight.

Preferably, the flame-retardant thermoplastic or thermoset polymer molding composition or polymer molding, film, filament, fiber or polymer shaped body comprises 1 to 30% by weight of mixtures as claimed in at least one of claims 1 to 20, 10 to 95% by weight of thermoplastic or thermoset polymer or mixtures thereof, 2 to 30% by weight of additives and 2 to 30% by weight of filler or reinforcing materials, where the sum of the components is 100% by weight.

Preferably, in such a flame-retardant thermoplastic or thermoset polymer molding composition or polymer molding, film, filament, fiber or polymer shaped body as claimed in claim 23 or 24, the polymer comprises polyesters, polyamides, thermoplastic elastomers, thermoplastic polyurethanes, thermoplastic polyester elastomers, styrenics, polyketones, polyolefins, polyacrylates and/or polymer blends comprising polyamides or polyesters or other blends; and the thermoset polymers are based on epoxides, acrylates, vinylesters, unsaturated polyesters and/or phenolics.

At least, the invention encompasses a flame-retardant plastics molding composition, film, filament, fiber or polymer shaped body as claimed in one or more of claims 23 to 25 for the use in or for connectors, power wetted parts in current distributors (RCCB), boards, potting compounds, power connectors, circuit breakers, lamp housing, LED housing, condenser housing, bobbins and fans, protection contacts, connectors, in/on circuit boards, casings for connectors, cables, flexible circuit boards, charger for mobile phones, engine covers, textile coatings, moldings in the form of components for the electrical/electronics sector, in particular for parts of printed circuit boards, housings, films, cables, switches, distribution boards, relays, resistors, capacitors, coils, lamps, diodes, LEDs, transistors, connectors, controllers, memories and sensors, in the form of large-area components, in particular housing parts for cabinets and in the form of elaborately designed components with sophisticated geometry.

Organic phosphinic acid salt corresponds to formula (I), also called phoshinates, are known in the state of the art. For the present invention, short chain dialkyl phosphinates are preferred, especially the aluminum salt of diethyl phosphinic acid.

The mixtures according to the present invention can be used in different plastic and polymers.

The plastics are preferably thermoplastic polymers of the type high-impact polystyrene, polyphenylene ether, polyamides, polyesters, polycarbonates and blends or polymer blends of the type ABS (acrylonitrile-butadiene-styrene) or PC/ABS (polycarbonate/acrylonitrile-butadiene-styrene) or PPE/HIPS (polyphenylene ether/HI polystyrene) plastics.

The plastics are more preferably polyamides, polyesters, thermoplastic polyester elastomers and PPE/HIPS blends.

The polymers preferably originate from the group of the thermoplastic polymers such as polyester, polystyrene, polyamide, polyketone or polyurethanes and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), e.g. high-density polyethylene (HOPE), high-density high-molar mass polyethylene (HDPE-HMW), high-density ultrahigh-molar mass polyethylene (HDPE-UHMW), medium-density polyethylene (MOPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides. The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrene 143E (BASF)), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as ABS, MBS, ASA or AES polymers.

The styrene polymers are preferably comparatively coarse-pore foam such as EPS (expanded polystyrene), e.g. Styropor (BASF) and/or foam with relatively fine pores such as XPS (extruded rigid polystyrene foam), e.g. Styrodur® (BASF). Preference is given to polystyrene foams, for example Austrotherm® XPS, Styrofoam® (Dow Chemical), Floormate®, Jackodur®, Lustron®, Roofmate®, Styropor®, Styrodur®, Styrofoam®, Sagex® and Telgopor®.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinyl idene chloride, vinyl chloride-vinyl acetate or vinyl idene chloride-vinyl acetate.

The polymers are preferably polymers which derive from alpha,beta-unsaturated acids and derivatives thereof, such as polyacrylates and polymethacrylates, polymethyl methacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers which derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals such as polyoxymethylene, and those polyoxymethylenes which contain comonomers, for example ethylene oxide; polyacetals which have been modified with thermoplastic polyurethanes, acrylates or MBS.

The polymers are preferably polyphenylene oxides and sulfides and mixtures thereof with styrene polymers or polyamides.

The polymers are preferably polyurethanes which derive from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide)), Nylon® 4/6, from DuPont), nylon 6 (polycaprolactam, poly-6-aminohexanoic acid, Nylon® 6, from DuPont, Akulon® K122, from DSM; Zytel® 7301, from DuPont; Durethan® B 29, from Bayer), nylon 6/6 ((poly(N, N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide), Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide; block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. In addition, ethylene-propylene-diene rubber-(EPDM-) or ABS-modified polyamides or copolyamides; and polyamides condensed during processing ("RIM polyamide systems").

The polymers are preferably polyureas, polyimides, polyamidimides, polyetherimides, polyesterimides, polyhydantoins and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates and polyester carbonates.

The polymers are preferably polysulfones, polyether sulfones and polyether ketones; crosslinked polymers which derive from aldehydes on the one hand, and phenols, urea or melamine on the other hand, such as phenol-formaldehyde, urea-formaldehyde and melamine-formaldehyde resins; drying and nondrying alkyd resins.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the abovementioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylate, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

Preference is given to using the flame retardant-stabilizer combination in the plastics molding composition in a total amount of from 2 to 50% by weight, based on the plastics molding composition.

Particular preference is given to using a flame retardant-stabilizer combination in the plastics molding composition in a total amount of from 10 to 30% by weight, based on the plastics molding composition.

Finally, the invention also relates to polymer shaped bodies, films, threads and fibers, each comprising a flame retardant-stabilizer combination according to the invention.

The polymer shaped bodies, films, threads and fibers are high-impact polystyrene, polyphenylene ethers, polyamides, polyesters, polycarbonates and blends or polymer blends of the type ABS (acrylonitrile-butadiene-styrene) or PC/ABS (polycarbonate/acrylonitrile-butadiene-styrene), polyamide, polyester and/or ABS.

More preferably the polymer comprises one or more polyamides, which may have been furnished with fillers and/or reinforcing agents.

The polyamides are preferably in the form of moldings, films, filaments and/or fibers.

The inventive use preferably comprises a composition of 30-93% by weight of polyamide 2-40% by weight of the mixture of the plurality of components A) to E)
5-50% by weight of fillers and/or reinforcing agents
0-40% by weight of other additions.

Surprisingly it has been found that combinations, according to the invention, of salts of dialkylphosphinic acids and alkaline earth metal stannates exhibit high flame retardancy in combination with improved stability in the processing of the molding compositions without dicoloration. This effect of corrosion prevention without discoloration reactions was not hitherto described in the prior art to this extent.

Preferably component D) comprises phosphonites or a mixture of a phosphonite and a phosphite.

Preferred salts of phosphorous acid (component C)) are salts which are sparingly soluble or insoluble in water.

Particularly preferred salts of phosphorous acid are aluminum, calcium, and zinc salts.

More preferably component C) is a reaction product of phosphorous acid and an aluminum compound.

Preferred are aluminum phosphites with the CAS numbers 15099-32-8, 119103-85-4, 220689-59-8, 56287-23-1, 156024-71-4, 71449-76-8, and 15099-32-8.

Preferred are aluminum phosphites of type $Al_2(HPO_3)_3 \ast 0.1\text{-}30 \ Al_2O_3 \ast 0\text{-}50H_2O$, more preferably $Al_2(HPO_3)_3 \ast 0.2\text{-}20 \ Al_2O_3 \ast 0\text{-}50H_2O$, very preferably $Al_2(HPO_3)_3 \ast 1\text{-}3 \ Al_2O_3 \ast 0\text{-}50H_2O$.

Preferred are mixtures of aluminum phosphite and aluminum hydroxide of the composition 5-95% by weight $Al_2(HPO_3)_3 \ast nH_2O$ and 95-5% by weight $Al(OH)_3$, more preferably 10-90% by weight $Al_2(HPO_3)_3 \ast nH_2O$ and 90-10% by weight $Al(OH)_3$, very preferably 35-65% by weight $Al_2(HPO_3)_3 \ast nH_2O$ and 65-35% by weight $Al(OH)_3$ and in each case n=0 to 4.

The aluminum phosphites preferably have particle sizes of 0.2 to 100 μm.

The preferred aluminum phosphites are produced customarily by reaction of an aluminum source with a phosphorus source and if desired a template in a solvent at 20 to 200° C. over a period of up to four days. For this, aluminum source and phosphorus source are mixed, heated under hydrothermal conditions or at reflux, and the solid is isolated by filtration, washed, and dried.

Preferred aluminum sources are aluminum isopropoxide, aluminum nitrate, aluminum chloride, aluminum hydroxide (e.g. pseudoboehmite).

Preferred phosphorus sources are phosphorous acid, (acidic) ammonium phosphite, alkali metal phosphites, or alkaline earth metal phosphites.

Preferred alkali metal phosphites are disodium phosphite, disodium phosphite hydrate, trisodium phosphite, potassium hydrogenphosphite.

Preferred disodium phosphite hydrate is Brüggolen® H10 from Bruggemann.

Preferred templates are 1,6-hexanediamine, guanidine carbonate or ammonia.

Preferred alkaline earth metal phosphite is calcium phosphite.

The preferred ratio of aluminum to phosphorus to solvent is 1:1:3.7 to 1:2.2:100 mol. The ratio of aluminum to template is 1:0 to 1:17 mol.

The preferred pH of the reaction solution is 3 to 9.

Preferred solvent is water.

Component B is preferably calcium stannate, calcium hydroxy stannate, magnesium stannate, magnesium hydroxy stannate or blends thereof.

Suitable components C are also compounds of the formulae (IX) to (XIV) or mixtures thereof

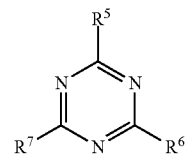
(IX)

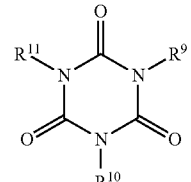
(X)

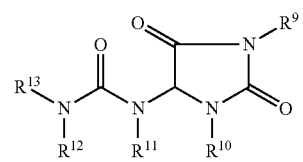
(XI)

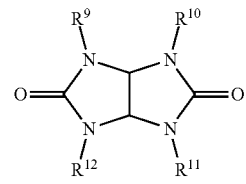
(XII)

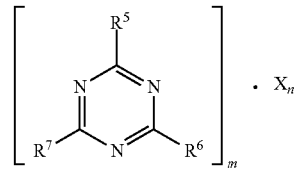
(XIII)

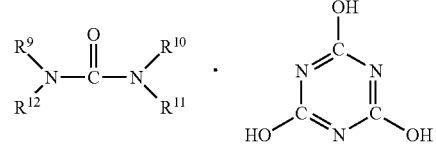
(XIV)

in which $R^5$ to $R^7$ are hydrogen, $C_1$-$C_8$-alkyl, $C_5$-$C_{16}$-cycloalkyl or -alkylcycloalkyl, possibly substituted by a hydroxyl or by a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, and also N-alicyclic or N-aromatic, $R^8$ is hydrogen, $C_1$-$C_8$-alkyl, $C_5$-$C_{16}$-cycloalkyl or -alkylcycloalkyl, possibly substituted by a hydroxyl or by a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl, $R^9$ to $R^{13}$ are the same groups as $R^8$ and also —O—$R^8$, m and n independently of one another are 1,2, 3 or 4, X are acids which are able to form adducts with triazine compounds; or are oligomeric esters of tris(hydroxyethyl) isocyanurate with aromatic polycarboxylic acids.

Particularly suitable components C are benzoguanamine, tris(hydroxyethyl)isocyanurate, allantoin, glycoluril, melamine, melamine cyan urate, dicyandiamide and/or guanidine.

Preferably M in formula (I) and (II) is calcium, aluminum or zinc.

By protonated nitrogen bases are meant preferably the protonated bases of ammonia, melamine, triethanolamine, especially $NH_4^+$.

Suitable phosphinates are described in PCT/WO97/39053, which is expressly referenced.

Particularly preferred phosphinates are aluminum, calcium, and zinc phosphinates.

In the application, with particular preference, the same salt of phosphinic acid as of phosphorous acid is used—in other words, for example, aluminum dialkylphosphinate together with aluminum phosphite, or zinc dialkylphosphinate together with zinc phosphite.

The combination according to the invention, comprising the components A and B and also optionally C, D, E and F may be admixed with additives, such as, for example, antioxidants, UV absorbers and light stabilizers, metal deactivators, peroxide-destroying compounds, polyamide stabilizers, basic costabilizers, nucleating agents, fillers and reinforcing agents, further flame retardants, and other additions.

Suitable antioxidants are, for example, alkylated monophenols, e.g. 2,6-di-tert-butyl-4-methylphenol; alkylthiomethylphenols, e.g. 2,4-dioctylthiomethyl-6-tert-butylphenol; hydroquinones and alkylated hydroquinones, e.g. 2,6-di-tert-butyl-4-methoxyphenol; tocopherols, e.g. α-tocopherol, β-tocopherol, γ-tocopherol, δ-tocopherol and mixtures thereof (vitamin E); hydroxylated thiodiphenyl ethers, e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide; alkylidenebisphenols, e.g. 2,2'-methylenebis(6-tert-butyl-4-methylphenol);

O—, N- and S-benzyl compounds, e.g. 3,5,3',5'-tetra-tert-butyl-4,4'-dihydroxydibenzyl ether; hydroxybenzylated malonates, e.g. dioctadecyl 2,2-bis(3,5-di-tert-butyl-2-hydroxybenzyl)malonate; hydroxybenzyl aromatics, e.g. 1,3,5-tris-(3,5-di-tert-butyl)-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tert-butyl-4-hydroxybenzyl)phenol; triazine compounds, e.g. 2,4-bisoctylmercapto-6(3,5-di-tert-butyl-4-hydroxyanilino)-1,3,5-triazine; benzylphosphonates, e.g. dimethyl 2,5-di-tert-butyl-4-hydroxybenzylphosphonate; acylaminophenols, 4-hydroxylauramide, 4-hydroxystearanilide, octyl N-(3,5-di-tert-butyl-4-hydroxyphenyl)carbamate; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl) propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Suitable UV absorbers and light stabilizers are, for example, 2-(2'-hydroxyphenyl)-benzotriazoles, for example 2-(2'-hydroxy-5'-methylphenyl)benzotriazole; 2-hydroxybenzophenones, for example the 4-hydroxy, 4-methoxy, 4-octoxy, 4-decyloxy, 4-dodecyloxy, 4-benzyloxy, 4,2',4'-trihydroxy, 2'-hydroxy-4,4'-dimethoxy derivative; esters of optionally substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate; acrylates, for example ethyl or isooctyl α-cyano-β,β-diphenylacrylate, methyl α-carbomethoxycinnamate, methyl or butyl α-cyano-μ-methyl-p-methoxycinnamate, methyl α-carbomethoxy-p-methoxycinnamate, N—(β-carbomethoxy-β-cyanovinyl)-2-methylindoline.

Additionally nickel compounds, for example nickel complexes of 2,2'-thiobis[4(1,1,3,3-tetramethylbutyl)phenol], such as the 1:1 or 1:2 complex, optionally with additional ligands such as n-butylamine, triethanolamine or N-cyclohexyldiethanolamine, nickel dibutyldithiocarbamate, nickel salts of monoalkyl 4-hydroxy-3,5-di-tert-butylbenzylphosphonates, such as of the methyl or ethyl ester, nickel complexes of ketoximes, such as of 2-hydroxy-4-methylphenyl undecyl ketoxime, nickel complexes of 1-phenyl-4-lauroyl-5-hydroxypyrazole, optionally with additional ligands; sterically hindered amines, for example bis(2,2,6,6-tetramethylpiperidyl) sebacate; oxalamides, for example 4,4'-dioctyloxyoxanilide; 2-(2-hydroxyphenyl)-1,3,5-triazines, for example 2,4,6-tris(2-hydroxy-4-octyloxyphenyl)-1,3,5-triazine.

Suitable metal deactivators are, for example, N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxaloyl dihydrazide, N,N'-bis(salicyloyl)thiopropionyl dihydrazide.

Suitable peroxide-destroying compounds are, for example, esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide, pentaerythrityl tetrakis((3-dodecylmercapto)propionate.

Suitable polyamide stabilizers are, for example, copper salts in combination with iodides and/or phosphorus compounds, and salts of divalent manganese.

Suitable basic costabilizers are melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or tin pyrocatecholate.

Suitable nucleating agents are, for example, 4-tert-butylbenzoic acid, adipic acid and diphenylacetic acid.

The fillers and reinforcing agents include, for example, calcium carbonate, silicates, glass fibers, carbon fibers, asbestos, talc, kaolin, mica, barium sulfate, metal oxides and hydroxides, carbon black, graphite, and others.

Further flame retardants are:

magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate and/or zinc stannate; melam, melem, melon, dimelamine pyrophosphate, melamine polyphosphate, melam polyphosphate, melon polyphosphate and/or melem polyphosphate and/or mixed poly salts thereof and/or ammonium hydrogenphosphate, ammonium dihydrogenphosphate and/or ammonium polyphosphate;

arylphosphates, phosphonate, salts of hypophosphorous acid and/or red phosphorus;

aluminum hypophosphite, zinc hypophosphite, calcium hypophosphite, sodium phosphite, monophenylphosphinic acid and salts thereof, mixtures of dialkylphosphinic acids and salts thereof and monoalkylphosphinic acids and salts thereof, 2-carboxyethylalkylphosphinic acid and salts thereof, 2-carboxyethyl-methylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof and adducts onto para-benzoquinone, or itaconic acid and salts thereof.

The other additives include, for example, plasticizers, expandable graphite, lubricants, emulsifiers, pigments, optical brighteners, flame retardants, antistats, blowing agents.

These additional additives can be added to the polymers before, together with or after addition of the flame retardants. These additives, and also the flame retardants, can be metered in as a solid, in solution or as a melt, or else in the form of solid or liquid mixtures or as masterbatches/concentrates.

In the phosphonites, preference is given to the following radicals:

R is $C_4$-$C_{18}$-alkyl(linear or branched), $C_4$-$C_{18}$-alkylene (linear or branched), $C_5$-$C_{12}$-cycloalkyl, $C_5$-$C_{12}$-cycloalkylene, $C_6$-$C_{24}$-aryl or -heteroaryl, $C_6$-$C_{24}$-arylene or -heteroarylene, which may also have further substitution;

$R_1$ is a compound of the structure (VII) or (VIII) where $R_2$ is independently $C_1$-$C_8$-alkyl(linear or branched), $C_1$-$C_8$-alkoxy, -cyclohexyl;

A is a direct bond, O, $C_1$-$C_8$-alkylene (linear or branched), $C_1$-$C_8$-alkylidene (linear or branched) and n is 0 to 3 m is 1 to 3.

In the phosphonites, particular preference is given to the following radicals:

R is cyclohexyl, phenyl, phenylene, biphenylyl and biphenylene $R_1$ is a compound of the structure (VII) or (VIII) where $R_2$ is independently $C_1$-$C_8$-alkyl(linear or branched), $C_1$-$C_8$-alkoxy, cyclohexyl A is a direct bond, O, $C_1$-$C_6$-alkylidene (linear or branched) and n is 1 to 3 m is 1 or 2.

Additionally claimed are mixtures of compounds according to the above claims in combination with phosphites of the formula (XV)

$$P(OR_1)_3 \quad\quad (XV)$$

where $R^1$ is as defined above.

Especially preferred are compounds which, based on the above information, are prepared by a Friedel-Crafts reaction of an aromatic or heteroaromatic, such as benzene, biphenyl or diphenyl ether, with phosphorus trihalides, preferably phosphorus trichloride, in the presence of a Friedel-Crafts catalyst such as aluminum chloride, zinc chloride, iron chloride, etc. and subsequent reaction with the parent phenols of the structures (VII) and (VIII). Explicitly included are also those mixtures with phosphites which form after the reaction sequence stated from excess phosphorus trihalide and the above-described phenols.

From this group of compounds, preference is given in turn to the following structures (XVI) and (XVII)

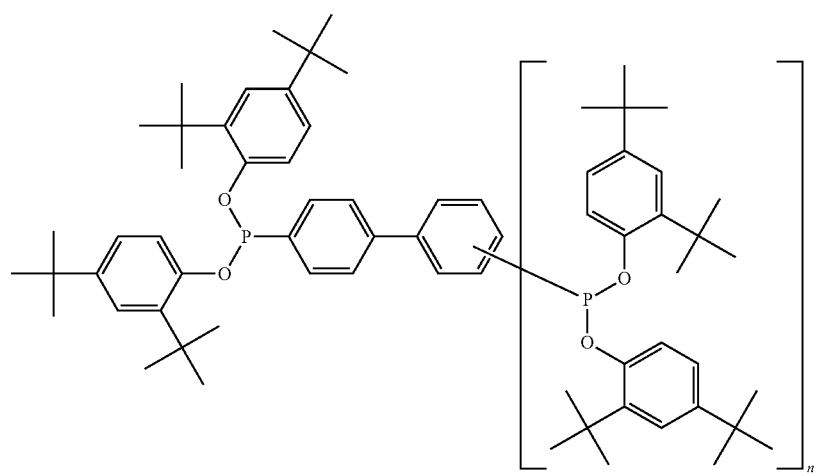

(XVI)

-continued

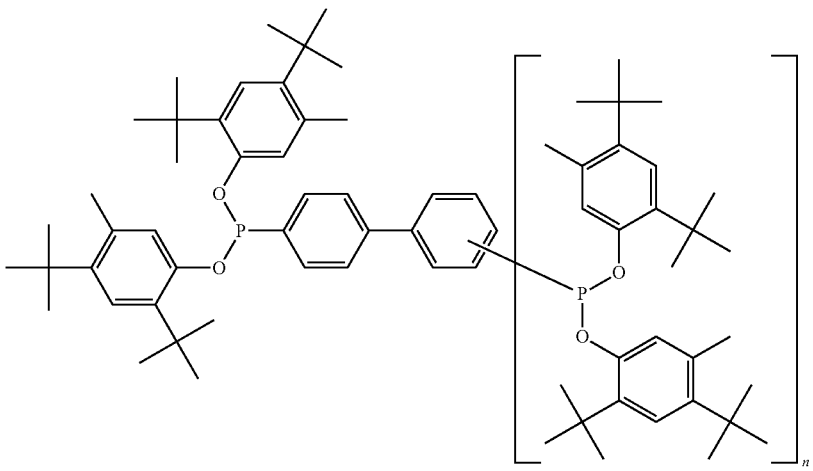

(XVII)

where n may be 0 or 1 and these mixtures may optionally further comprise proportions of the compound (XVIII) or (XIX):

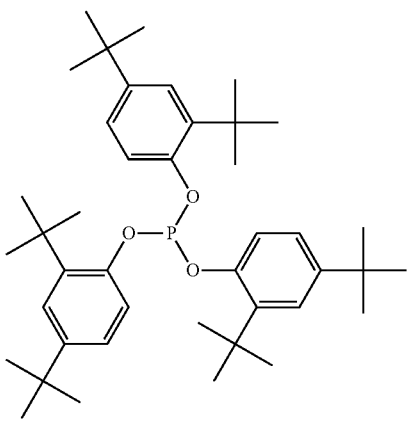

(XVIII)

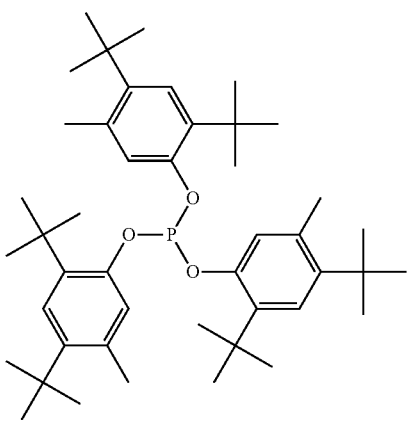

(XIX)

Suitable components E) are esters or salts of long-chain aliphatic carboxylic acids (fatty acids), which typically have chain lengths of $C_{14}$ to $C_{40}$. The esters are reaction products of the carboxylic acids mentioned with commonly used polyhydric alcohols, for example ethylene glycol, glycerol, trimethylolpropane or pentaerythritol. Useful salts of the carboxylic acids mentioned include in particular alkali metal or alkaline earth metal salts, or aluminum and zinc salts. Component E preferably comprises esters or salts of stearic acid, for example glyceryl monostearate or calcium stearate.

Component E preferably comprises reaction products of montan wax acids with ethylene glycol.

The reaction products are preferably a mixture of ethylene glycol mono-montan wax ester, ethylene glycol di-montan wax ester, montan wax acids, and ethylene glycol.

Component E preferably comprises reaction products of montan wax acids with a calcium salt.

The reaction products are more preferably a mixture of 1,3-butanediol mono-montan wax ester, 1,3-butanediol di-montan wax ester, montan wax acids, 1,3-butanediol, calcium montanate, and the calcium salt.

The proportions of the components A), and B) in the flame retardant combination are dependent substantially on the intended field of application, and may vary within wide limits. According to the field of application, the flame retardant combination comprises 40 to 99.9% by weight of component A and 0.1 to 60% by weight of component B. Component C is added at 0 to 79.9% by weight, and components D and E are added independently of one another at 0 to 3% by weight. Component F can be added in a range of 0 to 20% by weight.

The flame retardant/stabilizer combination is used preferably in the polyamide molding composition in a total amount of 0.5 to 45% by weight, based on the polymeric molding composition. The amount of polymer in that case is 55 to 99.5% by weight.

The flame retardant combination is used more preferably in the polymeric molding composition in a total amount of 1 to 30% by weight, based on the polymeric molding composition. The amount of polymer in that case is 10 to 95% by weight.

The polymer moldings, films, filaments and fibers preferably comprise the flame retardant/stabilizer combination in a total amount of 0.5 to 45% by weight, based on the polymer content. The amount of polymer in that case is 55 to 99.5% by weight.

The polymer moldings, films, filaments and fibers more preferably comprise the flame retardant combination in a total amount of 1 to 30% by weight, based on the polymer content. The amount of polymer in that case is 10 to 95% by weight.

The aforementioned additives can be introduced into the polymer in a wide variety of different process steps. For instance, it is possible in the case of polyamides to mix the additives into the polymer melt as early as at the start of or at the end of the polymerization/polycondensation or in a subsequent compounding operation.

In addition, there are processing operations in which the additives are added only at a later stage. This is practiced especially in the case of use of pigment or additive masterbatches. There is also the possibility of drum application, especially of pulverulent additives, to the polymer pellets, which may be warm as a result of the drying operation.

The invention finally also relates to a method for producing flame-retarded polymer moldings, wherein flame-retarded polymer molding compositions of the invention are processed by injection molding (e.g. injection molding machine (Aarburg Allrounder type)) and compression, foam injection molding, internal gas pressure injection molding, blow molding, film casting, calendering, laminating or coating at elevated temperatures to give the flame-retarded polymer molding.

Preferably the polyamides are of the amino acid type and/or of the diamine-dicarboxylic acid type.

Preferred polyamides are polyamide-6 and/or polyamide 66, and polyphthalamides.

Preferably the polyamides are unaltered, colored, filled, unfilled, reinforced, unreinforced, or else otherwise modified.

EXAMPLES

1. Components Used
   Commercial polymers (pellets):
     Polyamide 6.6 (PA 6.6-GV): Ultramid® A27 (from BASF, D)
     Polyphthalamide (PPA): Vestamid® HT plus M1000 and M3000 (from Evonik, D)
     Polybutylenterephthalate (PBT): Ultradur B4500 (from BASF, D)
     Glass fibers, PPG HP 3610 EC 10 4.5 mm (from PPG Ind. Fiber Glass, NL)
     Zinc borate Firebrake® 500, from Borax, USA
     Zinc stannate Flamtard® H and Flamtard® S, from William Blythe, UK
   Component A:
     Aluminum salt of diethylphosphinic acid, referred to hereinafter as DEPAL1
   Component A with Component F:
     Aluminum salt of diethylphosphinic acid with 0.1% Telomers, referred to hereinafter as DEPAL2
     Aluminum salt of diethylphosphinic acid with 2.5% Telomers, referred to hereinafter as DEPAL3
   Component B:
     Calcium stannate from William Blythe, UK,
     Magnesium stannate
     Barium stannate
   Component C:
     Aluminum salt of phosphorous acid, referred to hereinafter as PHOPAL
     Melamine polyphosphate (referred to as MPP), Melapur® 200 (from BASF, D)
   Component D:
     Sandostab® P-EPQ, from Clariant GmbH, D
     Hostanox 010, from Clariant GmbH, D
   Component E:
     Licowax® E, from Clariant Produkte (Deutschland) GmbH, D (ester of montan wax acid)

2. Production, Processing, and Testing of Flame-Retardant Polymeric Molding Compositions The flame retardant components were mixed with the phosphonite, the lubricants and stabilizers in the ratio specified in the table and incorporated via the side intake of a twin-screw extruder (Leistritz ZSE $^{27}/_{44}$D) into PA 6.6 at temperatures of 260 to 310° C., into PPA at 300-340° C., and into PBT at 230-260° C. The glass fibers were added via a second side intake. The homogenized polymer strand was drawn off, cooled in a water bath and then pelletized. Processability was rated according to strand breakage which could happen during compounding.

After sufficient drying, the molding compositions were processed to test specimens on an injection molding machine (Arburg 320 C Allrounder) at melt temperatures of 230 to 340° C., and tested and classified for flame retardancy using the UL 94 test (Underwriter Laboratories).

The UL 94 fire classifications are as follows:
  V-0: afterflame time never longer than 10 sec, total of afterflame times for 10 flame applications not more than 50 sec, no flaming drops, no complete consumption of the specimen, afterglow time for specimens never longer than 30 sec after end of flame application
  V-1: afterflame time never longer than 30 sec after end of flame application, total of afterflame times for 10 flame applications not more than 250 sec, afterglow time for specimens never longer than 60 sec after end of flame application, other criteria as for V-0
  V-2: cotton ignited by flaming drops, other criteria as for V-1
  Not classifiable (ncl): does not comply with fire classification V-2.

The flowability of the molding compositions was determined by finding the melt volume flow rate (MVR) at 275° C./2.16 kg. A sharp rise in the MVR value indicates polymer degradation. MVR is also affected by fillers.

Tensile strength (N/mm$^2$), elongation at break, and breaking strength were measured according to DIN EN ISO 527(%), impact strength [kJ/m$^2$] and notched impact strength [kJ/m$^2$] in accordance with DIN EN ISO 179.

Colour of specimen was rated visually. Reference was the colour of nature polyamide which was processed with flame retardant and glass fibers as described above. Any change in colour was noted as slight, medium, heavy brownish discoloration.

The corrosion was investigated by means of the platelet method. The platelet method, developed at the OKI (Deutsches Kunststoffinstitut now Fraunhofer LBF, Darmstadt, Germany), serves for the model investigations for comparative evaluation of metallic materials and, respectively, the corrosion intensity and wear intensity of plastifying molding compositions. In this testing, two specimens are arranged in pairs in the die, so as to form a rectangular gap of 12 mm in length, 10 mm in width, and with a height of 0.1 up to a maximum of 1 mm adjustable height for the passage of the polymeric melt (FIG. 1). Through this gap, polymeric melt from a plastifying assembly is extruded (or injected), with large local shear stresses and shear rates occurring in the gap.

One parameter of wear is the weight loss of the specimens, which is determined by differential weighing of the specimens using an A&D analytical "Electronic Balance" with a deviation of 0.1 mg. The mass of the specimens was determined before and after the corrosion test, with 25 kg of polymer throughput on 1.2379 steel or 10 kg on CK 45 steel.

After a previously defined throughput (generally 25 or 10 kg), the sample platelets are demounted and are cleaned physically/chemically to remove the adhering polymer. Physical cleaning is accomplished by removing the hot polymer mass by rubbing it off with a soft material (cotton). Chemical cleaning is done by heating the specimens for 20 minutes at 60° C. in m-cresol. Polymeric composition still adhering after the boiling operation is removed by being rubbed off with a soft cotton pad.

All tests in the particular series, unless stated otherwise, were conducted under identical conditions (temperature programs, screw geometries, injection molding parameters, etc.) on account of comparability.

All quantities are reported as % by weight and are based on the polymeric molding composition including the flame retardant combination and adjuvants.

TABLE 1

Phosphinates and stannates in PA 66 GF (glass fiber reinforced polyamide 66).

|  | C1 | C2 | B1 | B2 | B3 | B4 |
|---|---|---|---|---|---|---|
| Polyamide 66 | 49.4 | 48.7 | 49.4 | 48.7 | 49.7 | 49.7 |
| Glass fibers | 30 | 30 | 30 | 30 | 30 | 30 |
| Component A: DEPAL1 | 11.5 | 16 | 11.5 | 16 | 16 | 16 |
| Component C: MPP | 6.5 |  | 6.5 |  |  |  |
| Component C: PHOPAL |  | 2 |  | 2 | 3 | 3 |
| Firebrake 500 | 1 |  | 1 |  |  |  |
| Flamtard H | 1 |  |  |  |  |  |
| Flamtard S |  | 3 |  |  |  |  |
| Component B: Mg-stannate |  |  |  |  | 1 |  |
| Component B: Ca-stannate |  |  | 1 | 3 |  | 1 |
| Component E: Licowax E | 0.3 | 0.3 | 0.3 | 0.3 | 0.3 | 0.3 |
| Component D: P-EPQ + O10 | 0.3 |  | 0.3 |  |  |  |
| Strand breakage | rare | rare | no | no | no | no |
| UL 94 1.6 mm | V-0 | V-0 | V-0 | V-0 | V-0 | V-0 |
| UL 94 0.8 mm | V-1 | V-1 | V-0 | V-0 | V-0 | V-0 |
| Corrosion on 1.2379 steel [%] | yes | no | no | no | no | no |
| Discoloration | slight | slight | no | no | no | no |

Table 1 shows examples of flame retarded PA 66 molding compositions. C1 and C2 are comparative compositions which reveal the state of the art. The inventive compositions are shown as B1 to B4. Using Ca-stannate or Mg-Stannate (component B) resulted in a significant benefit in reducing corrosion. There was not any measureable corrosion. The compositions B1 to B4 showed also an improvement in flame retardancy. The highest UL 94 classification V-0 could be achieved also with thin specimen. Processing of inventive mixtures (B1 to B4) was smoother and reduction of strand breakage could give a more economical processing. Since no discoloration happened during processing of inventive mixtures (B1 to B4) application area gets broader and pigmenting or dying will be easier.

TABLE 2

Phosphinates and stannates in PPA GF30 (glass fiber reinforced polyphthalamide).

|  | C3 | C4 | B5 | B6 | B7 | B8 | B9 |
|---|---|---|---|---|---|---|---|
| PPA | 55 | 55 | 55 | 55 | 55 | 55 | 55 |
| Glass fibers | 30 | 30 | 30 | 30 | 30 | 30 | 30 |
| Component A: DEPAL1 | 12 | 11 | 12 | 11 |  |  |  |
| Component A and component F: DEPAL3 |  |  |  |  | 13 | 13 | 13 |
| Component C: PHOPAL |  | 1 |  | 1 |  |  |  |
| Flamtard S | 3 | 3 |  |  |  |  |  |
| Component B: Ca-stannate |  |  | 3 | 3 | 2 |  |  |
| Component B: Mg-stannate |  |  |  |  |  | 2 |  |
| Component B: Ba-stannate |  |  |  |  |  |  | 2 |
| Corrosion on 1.2379 steel [%] | no | no | no | no | no | no | no |
| Strand breakage | yes | yes | no | no | no | no | no |
| UL 94 0.8 mm | V-1 | V-1 | V-0 | V-0 | V-0 | V-0 | V-0 |
| UL 94 1.6 mm | V-0 | V-0 | V-0 | V-0 | V-0 | V-0 | V-0 |
| Impact strength [kJ/m$^2$] | 67 | 60 | 67 | 68 | 66 | not determined | not determined |
| Notched impact strength [kJ/m$^2$] | 6.8 | 6.3 | 6.9 | 7 | 6.8 | not determined | not determined |
| Discoloration of specimen | heavy | heavy | no | no | no | no | no |

Table 2 shows examples of flame retarded semi aromatic polyamide molding compositions. $C_3$ and $C_4$ are comparative compositions which reveal the state of the art. The inventive compositions are shown as B5 to B9. All of the mentioned stannates are very good in preventing corrosion. The benefit of B5 to B9 over comparative compositions can be seen in the discoloration. While the formulation with Flametard S shows a heavy discoloration which limits application due to a lack of color choice, the inventive alkaline earth metals surprisingly did not show any discoloration of the injection molded parts. There was also an improvement in flame retardancy and the highest UL 94 class V-0 could be fulfilled in all thicknesses. Comparing $C_4$ to B6 an improvement in impact and notched impact strength could be seen with the inventive mixture.

The molding compositions with the inventive flame retardant mixtures B5 to B9 comply with exacting fire protection requirements in accordance with UL 94, and exhibit good mechanical properties and did not show any corrosion during processing and do not show any discoloration of compounds.

TABLE 3

Phosphinates and stannates in PBT GF30 (glass fiber reinforced polybutylentherephthalate).

|  | C5 | B10 |
|---|---|---|
| PBT | 50 | 50 |
| Glass fibers | 30 | 30 |
| Component A and component F: DEPAL2 | 14 | 13 |
| Component C: MPP | 7 | 6.5 |
| Component B: Ca-stannate |  | 0.5 |
| Corrosion on CK45 steel [%] | high | no |
| UL 94 0.8 mm | V-0 | V-0 |
| UL 94 1.6 mm | V-0 | V-0 |
| Elongation at break [%] | 1.6 | 1.7 |
| Tensile strength [N/mm$^2$] | 111 | 111 |

Table 3 shows examples of flame retarded polybutylenterephthalate molding compositions. C5 shows a state of the art flame retardant formulation. During processing high corrosion of processing tools could be noticed. The molding composition of the invention B10 shows no corrosion and meets exacting fire protection requirements in accordance with UL 94 VO as well as mechanical performance.

The invention claimed is:
1. A mixture containing
as component A at least one organic phosphinic acid salt and
as component B at least one alkali metal stannate (M'$_2$SnO$_3$), alkali metal hydroxyl stannate (M'$_2$Sn(OH)$_6$), alkaline earth metal stannate (M"SnO$_3$) and/or alkaline earth metal hydroxy stannate (M"Sn(OH)$_6$), wherein component B has a surface area of 20 to 200 m$^2$/g BET.

2. A mixture as claimed in claim 1, wherein M' is one of Na or K and M" is one of Mg, Ca or Ba.

3. A mixture as claimed in claim 1, wherein the at least one organic phosphinic acid salt corresponds to formula (I)

wherein
R$^1$, R$^2$ are the same or different and are each H, C$_1$-C$_{18}$-alkyl, linear or branched, C$_6$-C$_{18}$-aryl, C$_7$-C$_{18}$-arylalkyl or C$_7$-C$_{18}$-alkylaryl, or R$^1$ and R$^2$ form one or more rings with each other,
M is Mg, Ca, Al, Sb, Sn, Ge, Ti, Zn, Fe, Zr, Ce, Bi, Sr, Mn, Li, Na, K and/or a protonated nitrogen base;
m is from 1 to 4.

4. A mixture as claimed in claim 3, wherein R$^1$, R$^2$ are the same or different and are each methyl, ethyl, n-propyl, isopropyl, n-butyl, tert-butyl, n-pentyl, 2-pentyl, 3-pentyl, 2-methylbutyl, 3-methylbutyl(iso-mentyl), 3-methylbut-2-yl, 2-methylbut-2-yl, 2,2-dimethylpropyl(neopentyl), hexyl, heptyl, octyl, nonyl, decyl, cyclopentyl, cyclopentylethyl, cyclohexyl, cyclohexylethyl, phenyl, phenylethyl, methylphenyl und/oder and/or methylphenylethyl.

5. A mixture as claimed in claim 3, wherein M is a calcium, aluminum, zinc, titanium or iron ion.

6. A mixture as claimed in claim 1, containing 40 to 99.9% by weight of component A and 0.1 to 60% by weight of component B.

7. A mixture as claimed in claim 1, containing 70 to 99.9% by weight of component A and 0.1 to 30% by weight of component B.

8. A mixture as claimed in claim 1, containing 80 to 99% by weight of component A and 1 to 20% by weight of component B.

9. A mixture as claimed in claim 1, containing
as further component C 0 to 79.9% by weight of a nitrogen-containing synergist and/or a phosphorus/nitrogen flame retardant and/or phosphorus containing synergist or flame retardant which comprises a salt of phosphorous acid having the formula (II)

$$[HP(=O)O_2]^{2-}M'''^{m+} \qquad (II)$$

in which
M''' is Mg, Ca, Al, Sb, Sn, Ge, Ti, Zn, Fe, Zr, Ce, Bi, Sr, Mn, Li, Na and/or K, as further component D 0 to 3% by weight of a phosphonite or of a mixture of a phosphonite and a phosphite,
as further component E 0 to 3% by weight of an ester or salt of long-chain aliphatic carboxylic acids (fatty acids), which typically have chain lengths of C$_{14}$ to C$_{40}$, the sum of the components always being 100% by weight, and
as further component F, from 0 to 20% by weight of telomeric phosphinic acid salts, wherein the telomeric phosphinic acid salts are metal salts of ethyl butyl phosphinic acid, dibutyl phosphinic acid, ethyl hexyl phosphinic acid, butyl hexyl phosphinic acid, ethyl octyl phosphinic acid, see-butyl ethyl phosphinic acid, 1-ethylbutyl-butyl-phosphinic acid, ethyl-1-methyl-pentyl-phosphinic acid, di-see-butyl phosphinic acid (di-1-methyl-propyl phosphinic acid), propyl-hexyl phosphinic acid, dihexyl phosphinic acid, hexyl-nonyl phosphinic acid, propyl-nonyl phosphinic acid, dinonyl phosphinic acid, dipropyl phosphinic acid, butyl-octyl phosphinic acid, hexyl-octyl phosphinic acid, dioctyl phosphinic acid, ethyl cyclopentylethyl phosphinic acid, butyl cyclopentylethyl phosphinic acid, ethyl cyclohexylethyl phosphinic acid, butyl cyclohexylethyl phosphinic acid, ethyl phenylethyl phosphinic acid, butyl phenylethyl phosphinic acid, ethyl 4-methylphenylethyl phosphinic acid, butyl 4-methylphenylethyl phosphinic acid, butyl cyclopentyl phosphinic acid, butyl cyclohexylethyl phosphinic acid, butylphenyl phosphinic acid, ethyl 4-methylphenyl phosphinic acid and/or butyl 4-methylphenyl phosphinic acid and wherein the metal is minimum one of the group Mg, Ca, Al, Sb, Sn, Ge, Ti, Fe, Zr, Zn, Ce, Bi, Sr, Mn, Li, Na and/or K.

10. A mixture as claimed in claim 9, wherein the mixture comprises
40 to 98.9% by weight of component A,
1 to 39.9% by weight of component B,
0.1 to 59% by weight of component C,
0 to 2% by weight of component D,
0 to 2% by weight of component E, and
0 to 20% by weight of component F.

11. A mixture as claimed in claim 10, wherein the mixture comprises
50 to 94.5% by weight of component A,
5 to 39.5% by weight of component B,
0.5 to 45% by weight of component C,
0 to 2% by weight of component D,
0 to 2% by weight of component E, and
0 to 20% by weight of component F.

12. A mixture as claimed in claim 11, wherein the mixture comprises
60 to 94% by weight of component A,
5 to 30% by weight of component B,
1 to 35% by weight of component C,
0 to 2% by weight of component D
0 to 2% by weight of component E, and
0 to 20% by weight of component F.

13. A mixture as claimed in claim 12, wherein the mixture comprises
60 to 89.7% by weight of component A,
5 to 20% by weight of component B,
5 to 20% by weight of component C,
0.1 to 2% by weight of component D
0.1 to 2% by weight of component E, and
0.1 to 20% by weight of component F.

14. A mixture as claimed in claim 9, wherein component C comprises reaction products of phosphorous acid with aluminum compounds.

15. A mixture as claimed in claim 9, wherein component C comprises aluminum phosphite [Al(H$_2$PO$_3$)$_3$], secondary aluminum phosphite [Al$_2$(HPO$_3$)$_3$], basic aluminum phosphite [Al(OH)(H$_2$PO$_3$)$_2$*2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$*12H$_2$O, Al$_2$ $(HPO_3)_3*xAl_2O_3*nH_2O$ with x=1-2.27 and n=1-50 and/or $Al_4H_6P16O18$, or comprises aluminum phosphites of the formulae (III), (IV) and/or (V), where
formula (III) comprises:

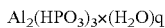

and
q is 0 to 4;
formula (IV) comprises

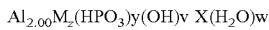

and
M is alkali metal ions,
Z is 0.01 to 1.5,
y is 2.63 to 3.5,
V is 0 to 2, and
W is 0 to 4;
formula (V) comprises

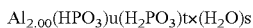

and
u is 2 to 2.99 and
t is 2 to 0.01 and
S is 0 to 4,
or the aluminum phosphite comprises mixtures of aluminum phosphite of the formula (III) with sparingly soluble aluminum salts and nitrogen-free foreign ions, mixtures of aluminum phosphite of the formula (IV) with aluminum salts, mixtures of aluminum phosphites of the formulae (IV) to (V) with aluminum phosphite $[Al(H_2PO_3)_3]$, with secondary aluminum phosphite $[Al_2(HPO_3)_3]$, with basic aluminum phosphite $[Al(OH)(H_2PO_3)_2*2aq]$, with aluminum phosphite tetrahydrate $[Al_2(HPO_3)_3*4aq]$, with aluminum phosphonate, with $Al_2(HPO_3)_9(OH)_6(1,6\text{-hexanediamine})_{1.5}*12H_2O$, with $Al_2(HPO_3)_3*xAl_2O_3*nH_2O$ with x=1-2.27 and n=1-50 and/or with $Al_4H_6P16O18$.

16. A mixture as claimed in claim 9, wherein component C comprises condensation products of melamine and/or reaction products of melamine with polyphosphoric acid and/or reaction products of condensation products of melamine with polyphosphoric acid, or mixtures thereof; or comprises melem, melam, melon, dimelamine pyrophosphate, melamine polyphosphate, melem polyphosphate, melam polyphosphate, melon polyphosphate and/or mixed polysalts thereof; or comprises nitrogen-containing phosphates of the formulae $(NH_4)_yH_{3-y}PO_4$ and/or $(NH_4PO_3)_z$, where y is 1 to 3 and z is 1 to 10000.

17. A mixture as claimed in claim 9, wherein the phosphonites (component D) are of the general structure $$R-[P(OR_1)_2]^m \qquad (VI)$$

where
R is a mono- or polyvalent aliphatic, aromatic or heteroaromatic organic radical and
$R_1$ is a compound of the structure (VII)

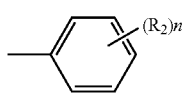

or the two radicals $R_1$ form a bridging group of the structure (VIII)

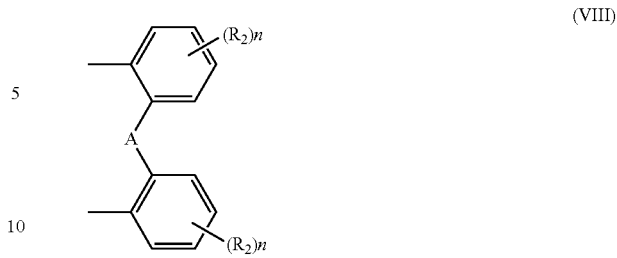

where
A is direct bond, O, S, $C_1$-$C_{18}$-alkylene (linear or branched), $C_1$-$C_{18}$-alkylidene (linear or branched), in which
$R_2$ independently at each occurrence is $C_1$-$C_{12}$-alkyl(linear or branched), $C_1$-$C_{12}$-alkoxy and/or $C_5$-$C_{12}$-cycloalkyl, and
n is 0 to 5, and
m is 1 to 4.

18. A mixture as claimed in claim 9, wherein component E comprises alkali metal, alkaline earth metal, aluminum and/or zinc salts of long-chain fatty acids having 14 to 40 carbon atoms and/or reaction products of long-chain fatty acids having 14 to 40 carbon atoms with polyhydric alcohols, such as ethylene glycol, glycerol, trimethylolpropane and/or pentaerythritol.

19. A product comprising the mixture of claim 1, wherein the product is a polymer stabilizer, crop protection composition, sequestrant, mineral oil additive, anticorrosive, washing composition, cleaning composition, or electronic, or a binder, crosslinker or accelerator in the curing of epoxy resins, polyurethanes or unsaturated polyester resins.

20. A product comprising the mixture of claim 1, wherein the product is a flame retardant for clearcoats and intumescent coatings, a flame retardant for wood and other cellulosic products, a flame retardant for polymers, a flame retardant polymer molding composition, a flame retardant polymer molding, a flame retardant polyester, or a flame retardant cellulose fabric.

21. A flame-retardant thermoplastic or thermoset polymer molding composition or polymer molding, film, filament, fiber or polymer shaped body comprising 0.5 to 45% by weight of the mixture as claimed in claim 1, 55 to 99.5% by weight of thermoplastic or thermoset polymer or mixtures thereof, 0 to 55% by weight of additives and 0 to 55% by weight of filler or reinforcing materials, where the sum of the components is 100% by weight.

22. A flame-retardant thermoplastic or thermoset polymer molding composition or polymer molding, film, filament, fiber or polymer shaped body as claimed in claim 21, wherein the polymer comprises polyesters, polyamides, thermoplastic elastomers, thermoplastic polyurethanes, thermoplastic polyester elastomers, styrenics, polyketones, polyolefins, polyacrylates and/or polymer blends comprising polyamides or polyesters or other blends and the thermoset polymers are based on epoxies, acrylates, vinylesters, unsaturated polyesters and/or phenolics.

23. A flame-retardant plastics molding composition, film, filament, fiber or polymer shaped body as claimed in claim 21 which comprises a flame retardant-stabilizer combination in an amount of from 10 to 30% by weight, based on the plastics molding composition.

24. A product comprising the flame-retardant plastics molding composition, film, filament, fiber or polymer shaped body as claimed in claim 21, wherein the product is a connector, a power wetted part in a current distributor (RCCB), boards, a potting compound, a power connector, a circuit breaker, a lamp housing, an LED housing, a condenser housing, a bobbin, a fan, a protection contact, a connector, a circuit board, a casings for a connector, a cable, a flexible circuit board, a charger for mobile phones, an engine cover, a textile coating, a molding in the form of a component for the electrical/electronics sector, a part of a printed circuit board, a housing, a film, a cable, a switch, a distribution board, a relay, a resistor, a capacitor, a coil, a lamp, a diode, an LED, a transistor, a connector, a controller, a memory, a sensor, a large-area component, or a housing part for cabinets.

25. A flame-retardant thermoplastic or thermoset polymer molding composition or polymer molding, film, filament, fiber or polymer shaped body comprising 1 to 30% by weight of the mixture as claimed in claim 21, 10 to 95% by weight of thermoplastic or thermoset polymer or mixtures thereof, 2 to 30% by weight of additives and 2 to 30% by weight of filler or reinforcing materials, where the sum of the components is 100% by weight.

\* \* \* \* \*